US010423845B2

(12) United States Patent
Miller et al.

(10) Patent No.: US 10,423,845 B2
(45) Date of Patent: Sep. 24, 2019

(54) REMOTE VIEW SYSTEM WITH PRIVACY PROTECTION

(71) Applicant: Robert Bosch GmbH, Stuttgart (DE)

(72) Inventors: James Stephen Miller, Dexter, MI (US); Patrick Graf, Southfield, MI (US); Robert Jones, Canton, MI (US); Bernhard Hilliger, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/560,387

(22) PCT Filed: Apr. 8, 2016

(86) PCT No.: PCT/US2016/026778
§ 371 (c)(1),
(2) Date: Sep. 21, 2017

(87) PCT Pub. No.: WO2016/164820
PCT Pub. Date: Oct. 13, 2016

(65) Prior Publication Data
US 2018/0068192 A1 Mar. 8, 2018

Related U.S. Application Data

(60) Provisional application No. 62/145,946, filed on Apr. 10, 2015.

(51) Int. Cl.
*G06K 9/00* (2006.01)
*B60R 25/30* (2013.01)
(Continued)

(52) U.S. Cl.
CPC ........ *G06K 9/00832* (2013.01); *B60R 25/305* (2013.01); *G06K 9/00838* (2013.01);
(Continued)

(58) Field of Classification Search
CPC .................. G06K 9/00832; G06T 2207/30268
See application file for complete search history.

(56) References Cited

U.S. PATENT DOCUMENTS 7,376,248 B2  5/2008 Ertl et al.
8,198,991 B2  6/2012 Do
(Continued)

FOREIGN PATENT DOCUMENTS

JP  2008009761 A  1/2008

OTHER PUBLICATIONS

Notification of Reasons for Refusal from the Japanese Patent Office for Application No. 2017-552922 dated Oct. 9, 2018 (7 pages).
(Continued)

*Primary Examiner* — Oneal R Mistry
(74) *Attorney, Agent, or Firm* — Michael, Best & Friedrich LLP

(57) ABSTRACT

A method of operating a remote view system with privacy protection and a remote view system with privacy protection. In one embodiment, the method includes receiving a request from a remote device for one or more images of a vehicle interior, receiving one or more images of the vehicle interior, determining whether a privacy key is located within the vehicle interior, determining whether one or more occupants are located within the vehicle interior, retrieving the privacy settings of the vehicle interior stored in memory, responsive to determining that the privacy key and the one or more occupants are located within the vehicle interior, generating one or more privacy images based on the one or more images and the privacy settings of the vehicle interior, controlling a transceiver to transmit the one or more privacy images to the remote device via an antenna.

14 Claims, 8 Drawing Sheets

(51) Int. Cl.
*H04W 12/02* (2009.01)
*B60R 25/31* (2013.01)
(52) U.S. Cl.
CPC ............ *H04W 12/02* (2013.01); *B60R 25/31* (2013.01); *B60R 2325/101* (2013.01); *G06T 2207/30268* (2013.01)

(56) References Cited

U.S. PATENT DOCUMENTS

| | | | |
|---|---|---|---|
| 8,594,861 | B2 | 11/2013 | Rovik et al. |
| 2002/0159270 | A1* | 10/2002 | Lynam .................. B60K 35/00 362/492 |
| 2004/0267410 | A1 | 12/2004 | Duri et al. |
| 2006/0238321 | A1* | 10/2006 | Chen .................. B60R 25/1004 340/438 |
| 2012/0256769 | A1 | 10/2012 | Satpathy |
| 2014/0096217 | A1* | 4/2014 | Lehmann ................ H04L 63/08 726/7 |
| 2014/0192194 | A1* | 7/2014 | Bedell ...................... B60R 1/00 348/148 |
| 2014/0313057 | A1 | 10/2014 | Kokal et al. |
| 2015/0049184 | A1 | 2/2015 | Hooton |
| 2015/0077556 | A1 | 3/2015 | Reed |
| 2015/0363986 | A1* | 12/2015 | Hoyos .................. H05K 999/99 340/5.61 |
| 2017/0076396 | A1* | 3/2017 | Sudak .................... G06Q 40/08 |

OTHER PUBLICATIONS

Notice of Preliminary Rejection from the Korean Intellectual Property Office for Application No. 10-2017-7032268 dated Dec. 7, 2018 (5 pages).
International Preliminary Report on Patentability for Application No. PCT/US2016/026778 dated Oct. 19, 2017 (11 pages).
International Search Report and Written Opinion for Application No. PCT/US2016/026778 dated Apr. 8, 2016, (15 pages).
Kim Yoohwan et al: "A server-based real-time privacy protection scheme against video surveillance by Unmanned Aerial Systems", 2014 International Conference on Unmanned Aircraft Systems (ICUAS), IEEE, May 27, 2014 (May 27, 2014), pp. 684-691, XP032610543, DOI: 10.1109/ICUAS.2014.6842313 [retrieved on Jun. 23, 2014] Sections V-VIII.; figures 3, 7; table 1.
Martin Sujitha et al: "Toward Privacy-Protecting Safety Systems for Naturalistic Driving Videos", IEEE Transactions on Intelligent Transportation Systems, IEEE, Piscataway, NJ, USA, vol. 15, No. 4, Aug. 1, 2014 (Aug. 1, 2014), pp. 1811-1822, XP011555215, ISSN: 1524-9050, DOI: 10.1109/TITS.2014.2308543 [retrieved on Jul. 31, 2014] Sections II and III.; figures 2, 4; table 1.

* cited by examiner

REMOTE VIEW SYSTEM WITH PRIVACY PROTECTION

CROSS-REFERENCE TO RELATED APPLICATION

This application claims the benefit of U.S. Provisional Patent Application No. 62/145,946 filed on Apr. 10, 2015, the entire contents of which are incorporated herein by reference.

BACKGROUND

Current vehicles can be equipped with interior cameras capable of viewing the interior of a vehicle and in some instances occupants of the vehicle. The interior cameras can be used for a number of applications related to the safety, security, comfort and convenience of the occupants within the interior of the vehicle.

SUMMARY

However, identities of the one or more occupants within the interior of the vehicle are remotely accessible when the interior cameras are remotely accessible. Thus, there is a need for a remote view system with privacy protection and a method for operating the remote view system with privacy protection.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the invention provides a method of operating a remote view system with privacy settings. The method includes receiving, with an electronic control unit, a request from a remote device for one or more images of a vehicle interior. The method also includes receiving, with the electronic control unit, the one or more images of the vehicle interior. The method also includes determining, with the electronic control unit, whether a privacy key is located within the vehicle interior. The method also includes determining, with the electronic control unit, whether one or more occupants are located within the vehicle interior. The method also includes retrieving, with the electronic control unit, the privacy settings of the vehicle interior stored in memory. The method also includes being responsive to determining that the privacy key and the one or more occupants are located within the vehicle interior, generating, with the electronic control unit, one or more privacy images based on the one or more images and the privacy settings of the vehicle interior. Additionally, the method also includes controlling a transceiver to transmit the one or more privacy images to the remote device via an antenna.

In another embodiment the invention provides a remote view system with privacy protection. The system comprising a camera configured to capture one or more images of a vehicle interior, and an electronic control unit having a first transceiver electrically coupled to a first antenna, a second transceiver electrically coupled to a second antenna, memory, and an electronic processor electrically coupled to the memory. The electronic control unit is configured to receive a request from a remote device for the one or more images of the vehicle interior via the first transceiver and the first antenna, receive the one or more images of the vehicle interior, determine whether a privacy key is located within the vehicle interior via the second transceiver and the second antenna, determine whether one or more occupants are located within the vehicle interior, retrieve privacy settings of the vehicle interior stored in the memory, generate one or more privacy images based on the one or more images and the privacy settings of the vehicle interior in response to determining that the privacy key and the one or more occupants are located within the vehicle interior, and control the first transceiver to transmit the one or more privacy images to the remote device via the first antenna.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, based on a reading of this detailed description, would recognize that, in at least one embodiment, the electronic based aspects of the invention may be implemented in software (for example, stored on non-transitory computer-readable medium) executable with one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (for example, a system bus) connecting the components.

Figure 1:
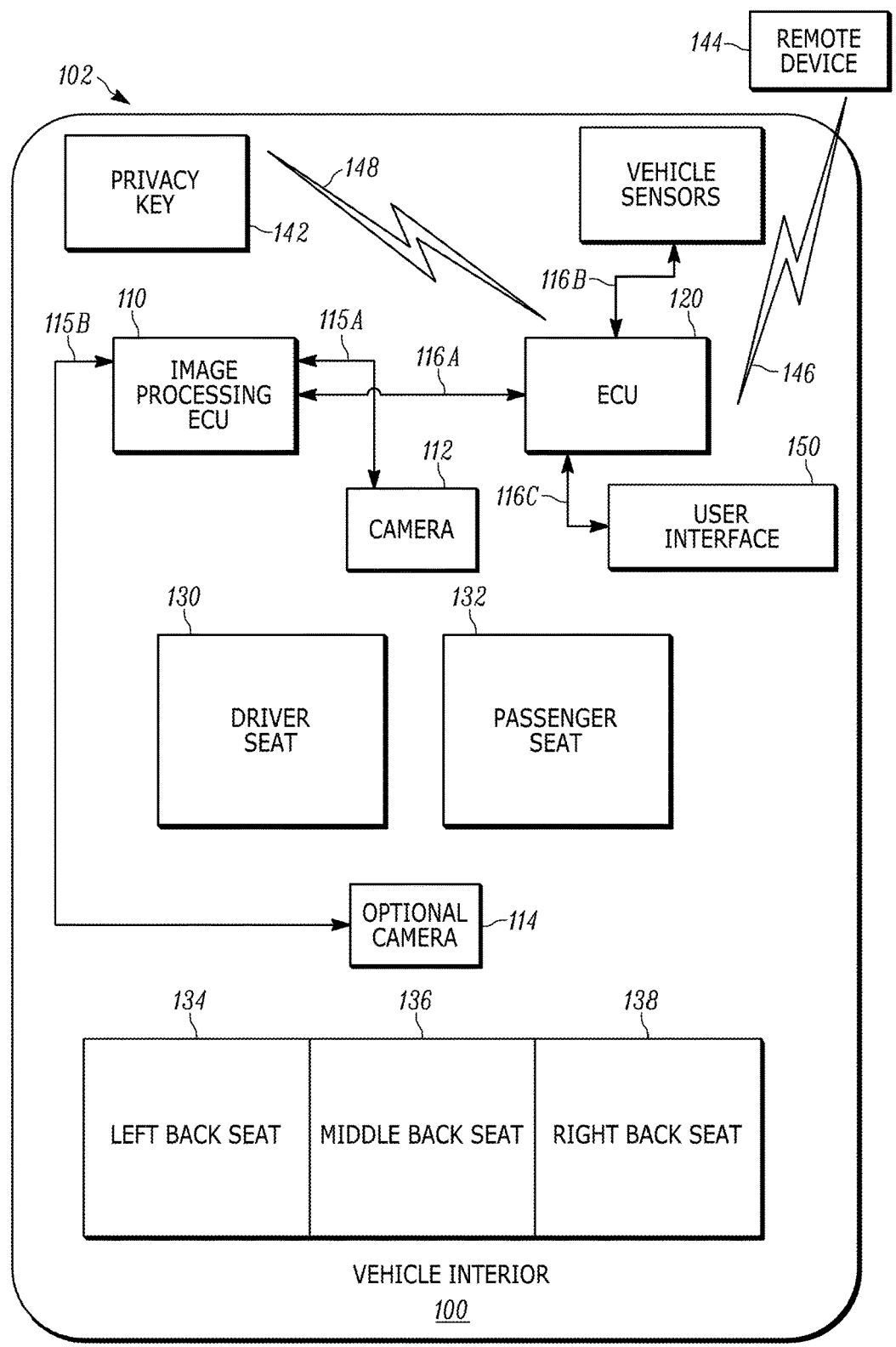
FIG. 1 is a block diagram of a vehicle interior equipped with a remote view system with privacy protection.

FIG. 1 is a block diagram that illustrates a vehicle interior 100 equipped with a remote view system with privacy protection 102 (referred to as "remote view system 102"). The remote view system 102 includes an image processing electronic control unit (ECU) 110, a camera 112 (for example, a fisheye lens camera or a wide angle lens camera), an optional camera 114, point-to-point connections 115A and 115B (collectively "point-to-point connections 115"), vehicle communication interfaces 116A-116C (collectively "vehicle communication interface 116"), an electronic control unit (ECU) 120, vehicle sensors 140, a privacy key 142, a remote device 144, a wireless network 146, and a wireless network 148. The wireless network 146 may be implemented in some or all of a cellular network, a Bluetooth® network, a wireless local access network (WLAN), a short range wireless network, a long range wireless network, or other suitable wireless network. The wireless network 148 may be implemented in some or all of a Bluetooth® network, a near field communication (NFC) network, a short range wireless network, a long range wireless network, or other suitable wireless network.

The vehicle interior 100 also includes a driver seat 130, a passenger seat 132, a left back seat 134, a middle back seat 136, a right back seat 138. Although the image processing ECU 110 and the ECU 120 are described and illustrated in FIG. 1 as separate components, it is understood that the image processing ECU 110 and the ECU 120 may be implemented together as a single electronic control unit. It is also understood that the functions attributed to the image processing ECU 110 and the ECU 120, respectively, may be entirely performed by one of the image processing ECU 110 or the ECU 120, or various combinations of both the image processing ECU 110 and the ECU 120.

The camera 112 is communicatively coupled to the image processing ECU 110 via the point-to-point connection 115A and transmits one or more images or a video stream to the image processing ECU 110. Additionally, in some embodiments, the optional camera 114 is communicatively coupled to the image processing ECU 110 via the point-to-point connection 115B and transmits one or more images or a video stream to the image processing ECU 110. The optional camera 114 is located in a position different than the position of the camera 112. For example, the optional camera 114 is located near the back of the vehicle interior 100 when the camera 112 is located near the front of the vehicle interior 100.

Figure 2:
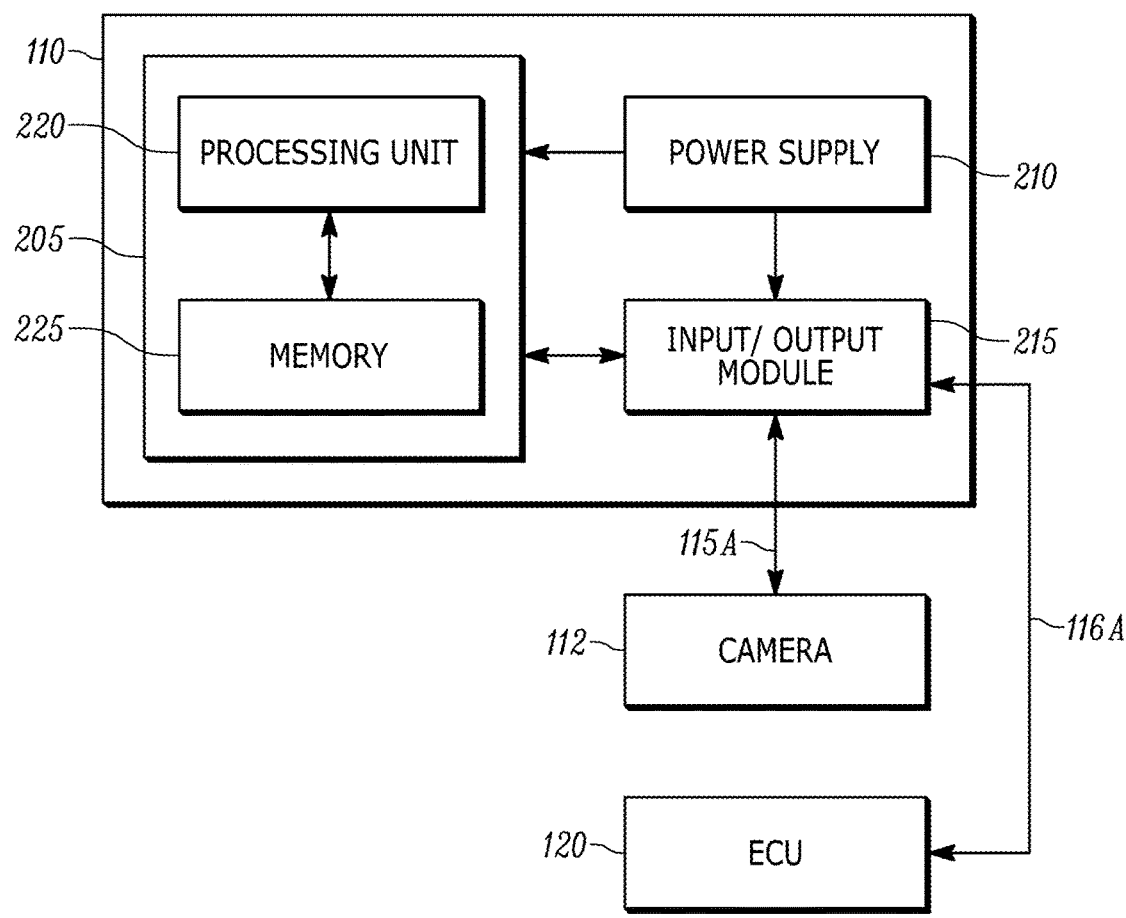
FIG. 2 is a block diagram of an image processing electronic control unit of the remote view system of FIG. 1.

The image processing ECU 110 receives the one or more images (for example, omnidirectional images) captured with the camera 112, and in some embodiments, the optional camera 114. In some embodiments, the image processing ECU 110 processes the one or more images at predetermined intervals of time and records the one or more images and associated data. For example, the image processing ECU 110 may process the one or more images based, at least in part, on a distance traveled by the vehicle interior 100. The image processing ECU 110 is communicatively coupled to the ECU 120 via the vehicle communication interface 116A and transmits the one or more images to the ECU 120. For example, FIG. 2 is a block diagram of the image processing ECU 110 of the remote view system 102 of FIG. 1. The image processing ECU 110 includes a plurality of electrical and electronic components that provide power, operation control, and protection to the components and modules within the image processing 110 and/or the camera 112. For example, the image processing ECU 110 includes, among other things, a controller 205 (such as a programmable electronic microprocessor, microcontroller, or other suitable processing device), a power supply 210, and an input/output module 215. In some embodiments, the image processing ECU 110 is integrated with the camera 112 into a single device.

In the example of FIG. 2, the controller 205 includes an electronic processor 220 and a memory 225. The electronic processor 220 is communicatively coupled (for example, electrically connected) to the memory 225 and executes instructions which are capable of being stored in the memory 225. The controller 205 is configured to retrieve from memory 225 and execute, among other things, instructions related to the control processes and methods described herein. The controller 205 may also be configured to retrieve from the memory 225 and execute instructions related to the occupant detection processes and methods described in co-pending PCT Application No. PCT/US16/26747 (filed Apr. 8, 2016), the entire content of which is herein incorporated by reference. In particular, the image processing ECU 110 may use an occupant detection system to identify a number, size, pose, and corresponding location of the one or more occupants within the vehicle interior 100. The image processing ECU 110 may output the information of the one or more occupants to the ECU 120 as metadata associated with the one or more images of the vehicle interior 100. In other embodiments, the image processing ECU 110 includes additional, fewer, or different components. It should be noted that the image processing ECU 110 may be implemented in several independent electronic control units each configured to perform specific functions listed herein. Additionally, the image processing ECU 110 may contain sub-modules that input specific types of sensor data and perform related processes.

The image processing ECU 110 is configured to receive one or more images from the camera 112 and process the one or more images. For example, in the embodiment of FIG. 2, the input/output module 215 receives the one or more images from the camera 112 and sends the one or more images to the controller 205 for image processing. The controller 205 then processes the one or more images. Alternatively, an analysis module executed by the controller 205 of the image processing ECU 110 may receive the one or more images from the camera 112, transform the one or more images into a suitable format, recognize objects and features (for example, one or more occupants within the vehicle interior) in the one or more images, track the objects and features within the one or more images, and control other ECUs (for example, the ECU 120), or send data outputs from these processes to other ECUs (for example, the one or more images and/or metadata to the ECU 120).

The image processing ECU 110, the sub-modules of the image processing ECU 110, and the additional ECUs (for example, the ECU 120) may be linked through one or more communication modules on the vehicle communication interface 116 and/or directly connected via the input/output module 215 of the image processing ECU 110. In some embodiments, the ECU 120 communicates by means of a protocol such as J1939 or CAN bus for communicating with the input/output module 215 of the image processing ECU 110. In other embodiments, the ECU 120 communicates with the input/output module 215 of the image processing ECU 110 under other suitable protocols depending on the needs of the specific application. In some embodiments, the input/output module 215 of the image processing ECU 110 inputs information directly using dedicated signal lines from the various controls and sensors.

Referring back to FIG. 1, the ECU 120 receives the one or more images from image processing ECU 110, and depending on various determinations as described in greater detail below, transmits the one or more images as described above or one or more privacy images to a remote device 144 in response to receiving a request from the remote device 144 over the wireless network 146. For example, the ECU 120 may transmit the one or more images or the one or more privacy images over the wireless network 146 to the remote device 144.

The request from the remote device 144 may be initiated by a user of the remote device 144 to access images or video from the vehicle interior 100 to determine whether an item is located within the vehicle interior 100. Additionally or alternatively, the request from the remote device 144 may be initiated by a user of the remote device 144 to access images or video from the vehicle interior 100 to determine whether any occupants are in the vehicle interior 100. In some embodiments, the remote device 144 is a smartphone, a tablet, a server, or other suitable communication device. In some embodiments, the remote device 144 is accessed by a user of the vehicle interior 100 or a third-party user (for example, emergency personnel).

In some embodiments, the vehicle interior 100 has one or more occupants when the ECU 120 receives the request from the remote device 144 to transmit an image of the vehicle interior 100. To implement privacy protection for the one or more occupants within the vehicle interior 100 when transmitting the one or more images or the one or more privacy images of the vehicle interior 100, the ECU 120 uses privacy settings stored in memory of the ECU 120.

Figure 3:
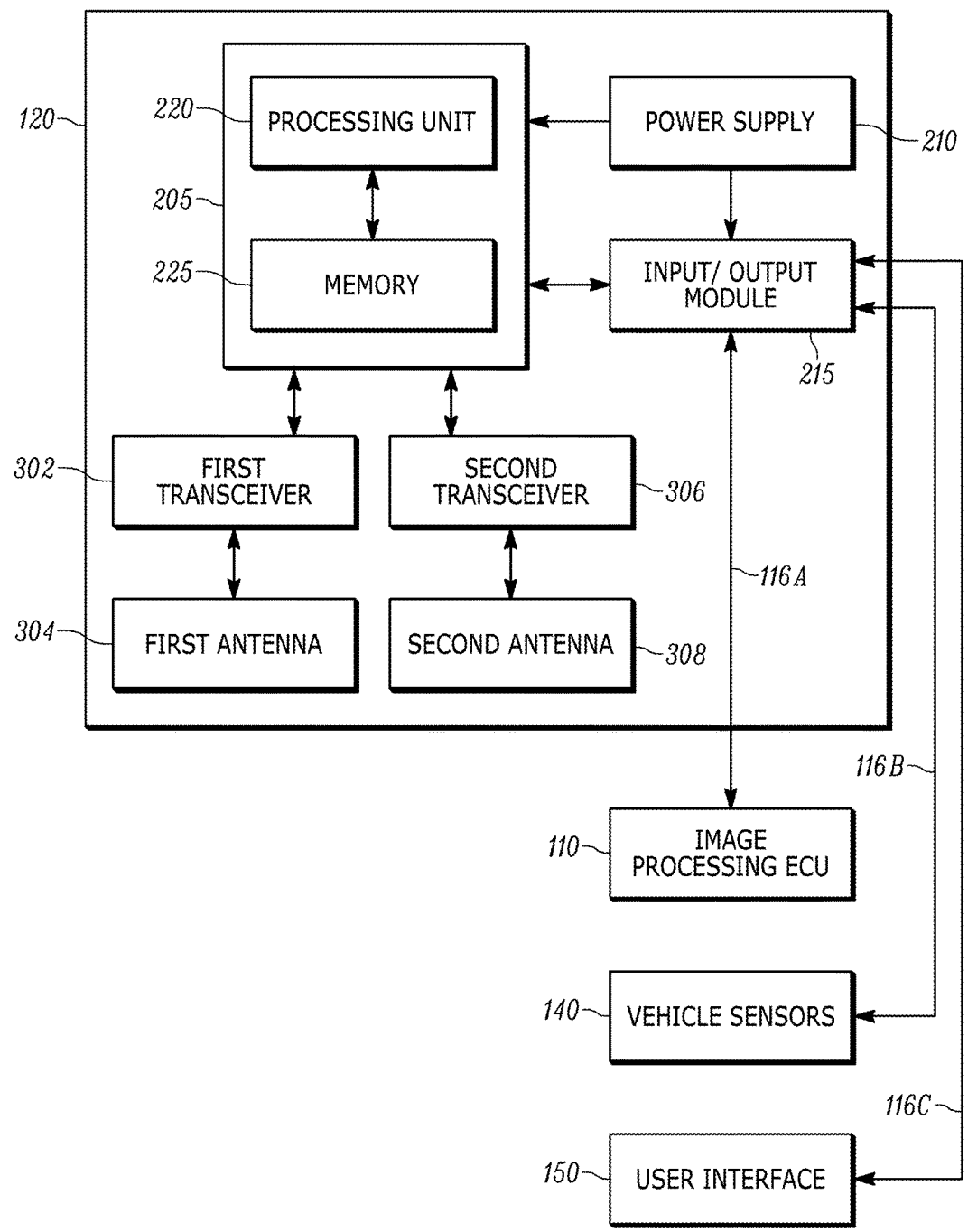
FIG. 3 is a block diagram of an electronic control unit of the remote view system of FIG. 1.

The ECU 120 may generate one or more privacy images from the one or more images based at least in part on the privacy settings retrieved from the memory of the ECU 120. For example, FIG. 3 is a block diagram of the ECU 120 of the remote view system 102 of FIG. 1. The ECU 120 includes components similar to the image processing ECU 110 and as a consequence those components will not be described in greater detail. The ECU 120 includes a first transceiver 302, a first antenna 304, a second transceiver 306, and a second antenna 308. In some embodiments, the ECU 120 is dedicated to the remote view system 102. In other embodiments, the ECU 120 is shared among various vehicle systems including the remote view system 102. In some embodiments, the ECU 120 is part of a multi-camera system (for example, an exterior surround view system, a backup camera system, or other vehicle camera system).

The controller 205 of the ECU 120 includes an electronic processor 220 and a memory 225. The electronic processor 220 is communicatively coupled (for example, electrically connected) to the memory 225 and executes instructions which are capable of being stored in the memory 225. The memory 225 of the ECU 120 also stores privacy settings associated with the vehicle interior 100. The controller 205 is configured to retrieve from memory 225 and execute, among other things, instructions related to the control processes and methods described herein (for example, control processes and method based on the privacy settings as described in greater detail below). In other embodiments, the ECU 120 includes additional, fewer, or different components. It should be noted that the ECU 120 may be implemented in several independent electronic control units each configured to perform specific functions listed herein. Additionally, the ECU 120 may contain sub-modules that input specific types of sensor data and perform related processes.

The input/output module 215 of the ECU 120 is configured to receive the one or more images from the image processing ECU 110 along with the associated metadata (for example, the metadata may include the number of occupants, the pose of each of the one or more occupants, the size of each of the one or more occupants, the location of each of the one or more occupants, or other suitable metadata). The controller 205 is configured to process the video or one or more images received by the input/output module 215. For example, in the embodiment of FIG. 3, the input/output module 215 receives the one or more images from the image processing ECU 110 and sends the one or more images to the controller 205 for image processing. The controller 205 then processes the one or more images. By processing the one or more images, the controller 205 of the ECU 120 may generate one or more privacy images from the one or more images. Additionally, depending on various determinations, the controller 205 may control the first transceiver 302 and the first antenna 304 to transmit the one or more privacy images to a remote device (for example, the remote device 144). Alternatively, depending on various determinations, the controller 205 may control the first transceiver 302 and the first antenna 304 to transmit the one or more images directly from the image processing ECU 110 to a remote device (for example, the remote device 144). The first transceiver 302 is a long range radio frequency (RF) transceiver (for example, an RF transceiver that communicates over one of second generation (2G), third generation (3G), or fourth generation Long Term Evolution (4G LTE), a wireless local area network (WLAN) transceiver, or other suitable long range RF transceiver).

The ECU 120, the sub-modules, and the additional ECUs (for example, the image processing ECU 110) may be linked through one or more communication modules on the vehicle communication interface 116 and/or directly connected via the input/output module 215. In some embodiments, the image processing ECU 110 communicates by means of a protocol such as J1939 or CAN bus for communicating with the input/output module 215. In other embodiments, the image processing ECU 110 communicates with the input/output module 215 under other suitable protocols depending on the needs of the specific application. In some embodiments, the input/output module 215 inputs information directly using dedicated signal lines from the various controls and sensors.

Referring back to FIG. 1, in some embodiments, the ECU 120 may also detect or communicate a privacy key 142 within the vehicle interior 100 via the wireless network 148. In the example of FIG. 3, the second transceiver 306 is a short range RF transceiver (for example, a Bluetooth® transceiver, an NFC transceiver, or other suitable short range RF transceiver). The privacy key 142 may be a smartphone, a key fob, a tablet, a smartwatch, or other suitable wireless device that can be detected by the ECU 120 or other vehicle systems. The privacy key 142 may also be used by the ECU 120 to further control the privacy settings of the vehicle interior 100.

In some embodiments, the privacy settings include different thresholds and the ECU 120 alters or adjusts the different thresholds of the privacy settings based on the detection of the privacy key 142 within the vehicle interior 100. For example, the ECU 120 may disable the remote view system 102 (for example, set the privacy settings to a maximum privacy threshold) when the privacy key 142 is present within the vehicle interior 100. Alternatively, the ECU 120 may enable the remote view system 102 (for example, deactivate the privacy settings or decrease the privacy settings from the maximum privacy threshold) when the privacy key 142 is not present within the vehicle interior 100. Additionally, depending on the different thresholds of the privacy settings, the ECU 120 may generate one or more privacy images by censoring one or more portions of the one or more images that contain the one or more occupants to varying degrees as described in greater detail below.

The ECU 120 generates the one or more privacy images prior to transmitting the privacy image to the remote device 144 over the wireless network 146. In this manner, any privacy images transmitted to the remote device 144 would reduce or eliminate the identities of the one or more occupants located within the vehicle interior 100.

In some embodiments, the ECU 120 defaults to privacy settings set to at least the low threshold for the vehicle interior 100. In the illustrated embodiment of FIG. 1, the ECU 120 is connected to a user interface 150 via the vehicle communication interface 116C that allows a user of the vehicle interior 100 to adjust the different thresholds of the privacy settings including a default threshold setting. The user interface may also allow the user to register or pair different privacy keys with the ECU 120. Additionally or alternatively, the ECU 120 may activate or deactivate the privacy settings in response to inputs or commands received from other vehicle systems. The user interface 150 may include a graphical user interface that is displayed on and receives inputs from a touchscreen display, a graphical user interface that is displayed on a display and receives inputs from a control device, or other suitable user interface.

The vehicle sensors 140 are communicatively coupled to the ECU 120 via the vehicle communication interface 116B and the vehicle sensors 140 may indicate whether the vehicle including the vehicle interior 100 is in an accident. In some embodiments, the vehicle sensors 140 transmit information that enables the ECU 120 to determine a position, heading, and motion of the vehicle. In some embodiments, the ECU 120 determines whether the vehicle has been in an accident based on the information received from the vehicle sensors 140. The ECU 120 deactivates the privacy settings when the vehicle including the vehicle interior 100 is in an accident. The deactivation of the privacy settings may allow emergency dispatchers or other emergency personnel to access and remotely view the one or more images of the vehicle interior 100 without privacy protection. In some embodiments, the vehicle sensors 140 include a global positioning system (GPS), one or more airbag sensors, or other suitable crash sensor.

Figure 4:
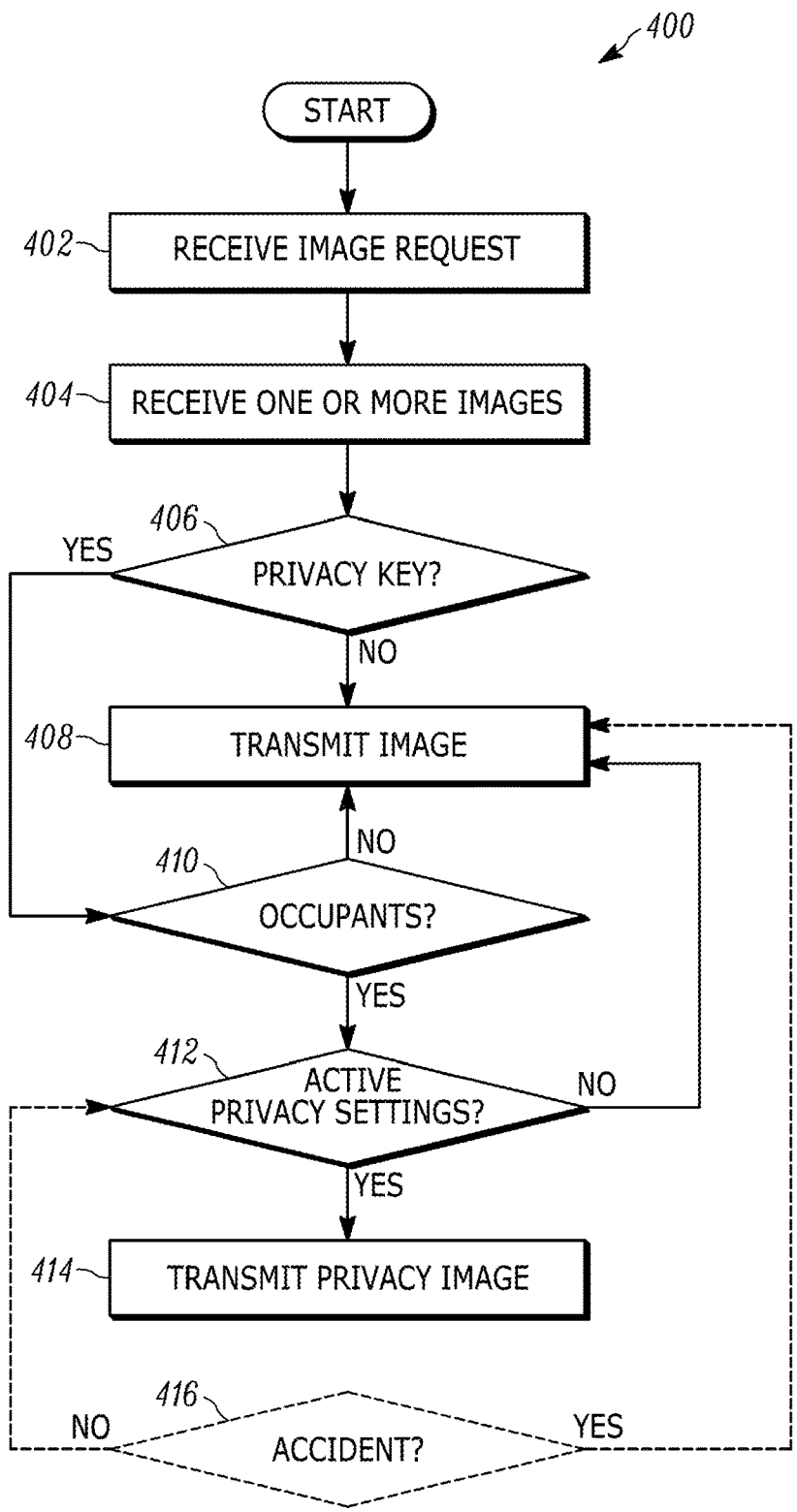
FIG. 4 is a flowchart of a method of operating the remote view system of FIG. 1.

FIG. 4 is a flowchart of the method 400 for operating the remote view system 102. The method 400 is described with respect to FIG. 3. However, it should be understood that the functionality illustrated in the method 400 may be distributed among multiple devices, such as between the image processing ECU 110, the ECU 120, and/or other vehicle systems. It is also understood that functionality illustrated in the method 400 is not limited to being performed by the ECU 120, but may also be performed by the image processing ECU 110 or other vehicle systems.

As illustrated in FIG. 4, the ECU 120 receives an image request from a remote device (for example, the remote device 144 as described above)(at block 402). In some embodiments, the ECU 120 receives an image request from a remote server (for example, a computer at an emergency dispatch center) via the first transceiver 302 and the first antenna 304.

The ECU 120 also receives one or more images of a vehicle interior (for example, the vehicle interior 100 as described above) from the camera 112 via the image processing ECU 110 (at block 404). In some embodiments, the ECU 120 receives the one or more images continuously or upon requesting the one or more images from the image processing ECU 110. In other embodiments, the one or more images are a video stream from the camera 112 with a wide angle lens that covers all seating areas in the vehicle interior. The one or more images may be one of a raw image, a processed image, a compressed image, or an uncompressed image. Additionally, the ECU 120 receives metadata associated with the one or more images from the image processing ECU 110.

The ECU 120 determines whether a privacy key (for example, the privacy key 142 as described above) is located within the vehicle interior (at decision block 406). For example, the second transceiver 306 of the ECU 120 is a short range radio frequency (RF) transceiver that receives signals from a wireless key fob via the second antenna 308. The wireless key fob may be registered as a privacy key in the memory 225 of the ECU 120. In another example, the ECU 120 can determine whether a smartphone is connected to the ECU 120 over a wireless network (for example, the wireless network 148 as described above), registered as a privacy key in the memory 225 and located within the vehicle interior.

The ECU 120 may determine whether the privacy key is located in the vehicle interior based on location information received from the privacy key (for example, GPS information or other location based information). Alternatively, the ECU 120 may determine whether the privacy key is located in the vehicle based on the characteristics of the wireless network that connects the ECU 120 and the privacy key via the second transceiver 306 and the second antenna 308. For example, the ECU 120 has information stored in the memory 225 of the ECU 120 regarding a maximum distance of the wireless network, and based on the maximum distance, the ECU 120 determines whether the privacy key is located within the vehicle interior. In other words, the ECU 120 may have information stored in the memory 225 of the ECU 120 that the maximum distance of the wireless network is six feet. If the vehicle interior is six feet long and the ECU 120 does not detect or connect to the privacy key over the wireless network, then the ECU 120 can determine that the privacy key is not located in the vehicle interior.

Figure 5:
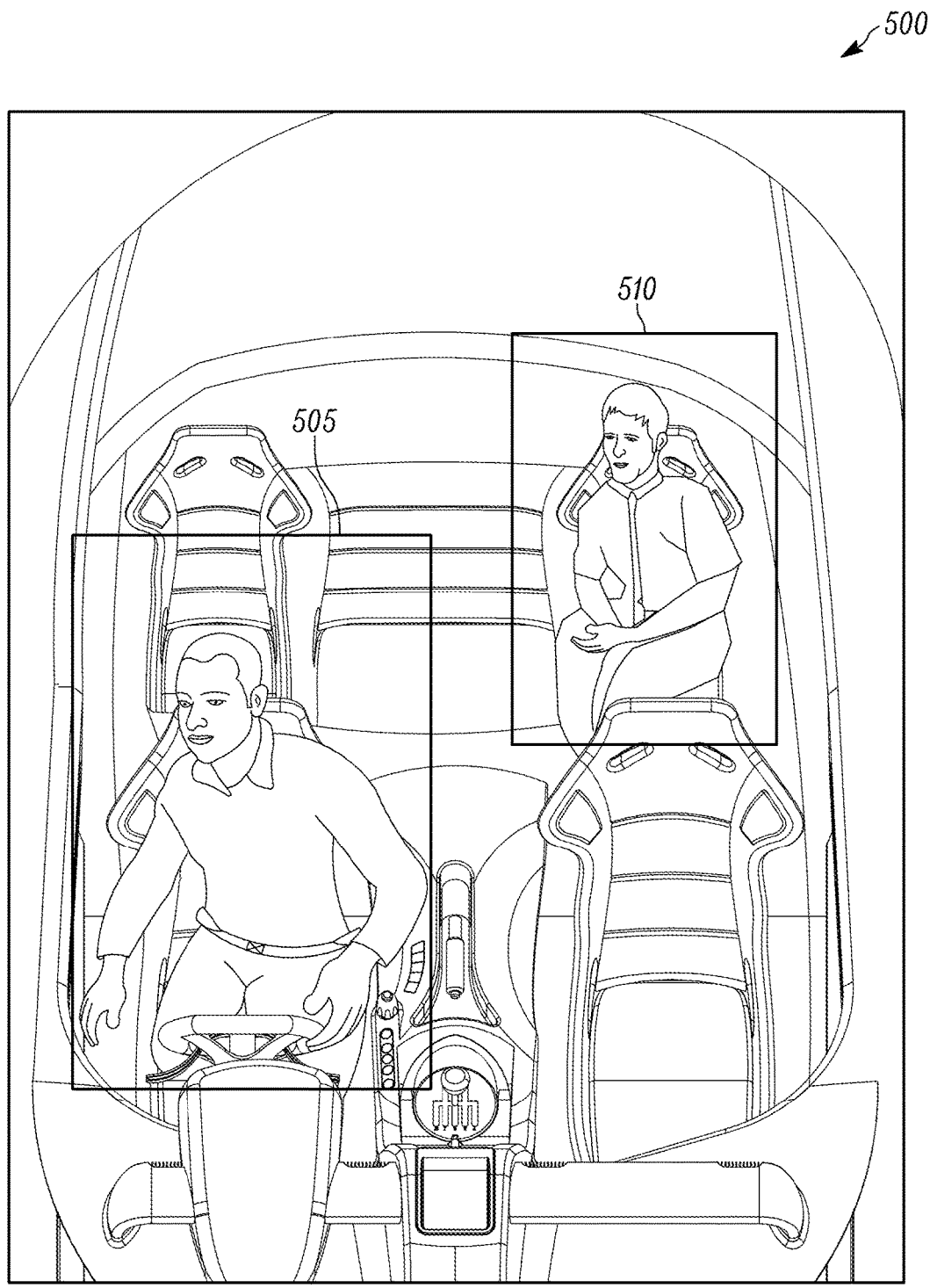
FIG. 5 is an image of the vehicle interior without any privacy protection.

If the ECU 120 determines that the privacy key is not located within the vehicle interior (at decision block 406), then ECU 120 controls the first transceiver 302 to transmit the one or more images from the image processing ECU 110 over the wireless network (for example, the wireless network 146) via the first antenna (at block 408). In this manner, the ECU 120 does not generate any images with privacy protection because the privacy key is not located within the vehicle interior. For example, FIG. 5 is an image 500 of the vehicle interior without any privacy protection. In this illustrated embodiment, the image 500 includes two occupants, a first occupant 505 and a second occupant 510. The two occupants are objects of interest that are detected by the occupant detection system of the image processing ECU 110 as described above and information regarding the two occupants is provided as associated metadata to the ECU 120. As illustrated in FIG. 5, the first occupant 505 and the second occupant 510 occupy portions (for example, the driver seat 130 and the right back seat 138 of the vehicle interior, respectively) of the image 500 from the camera 112.

If the ECU 120 determines that the privacy key is located within the vehicle interior, then the ECU 120 determines whether one or more occupants are located within the vehicle interior (at decision block 410). For example, the ECU 120 can use the metadata associated with the one or more images of the vehicle interior to determine whether one or more occupants are located within the vehicle interior. Alternatively, the ECU 120 receives information from other vehicle sensors (for example, the vehicle sensors 140 as described above) and the ECU 120 can determine whether the one or more occupants are within the vehicle based on the information from the other vehicle sensors. For example, if the ECU 120 receives an indication from a seatbelt engagement sensor or an indication from a weight sensor, the ECU 120 can then determine that the one or more occupants are within the vehicle interior.

If the ECU 120 determines that there are no occupants within the vehicle interior, then the ECU 120 controls the first transceiver 302 to transmit the one or more images (for example, the image 500 as described above) from the image processing ECU 110 over the wireless network via the first antenna 304 (at block 408). In this manner, the ECU 120 does not generate any images with privacy protection because there are no occupants located within the vehicle interior 100.

If the ECU 120 determines that there are occupants within the vehicle interior (at decision block 410), then the ECU 120 retrieves privacy settings stored in the memory 225 of the ECU 120 and determines whether the privacy settings are activated (at decision block 412). If the ECU 120 determines that the privacy settings are not activated (at decision block 412), then the ECU 120 controls the first transceiver 302 to transmit the one or more images (for example, the image 500 as described above) from the image processing ECU 110 over the wireless network via the first antenna 304 to the remote device (at block 408). In this manner, the ECU 120 does not generate any images with privacy protection because the privacy settings are not activated.

Figure 6:
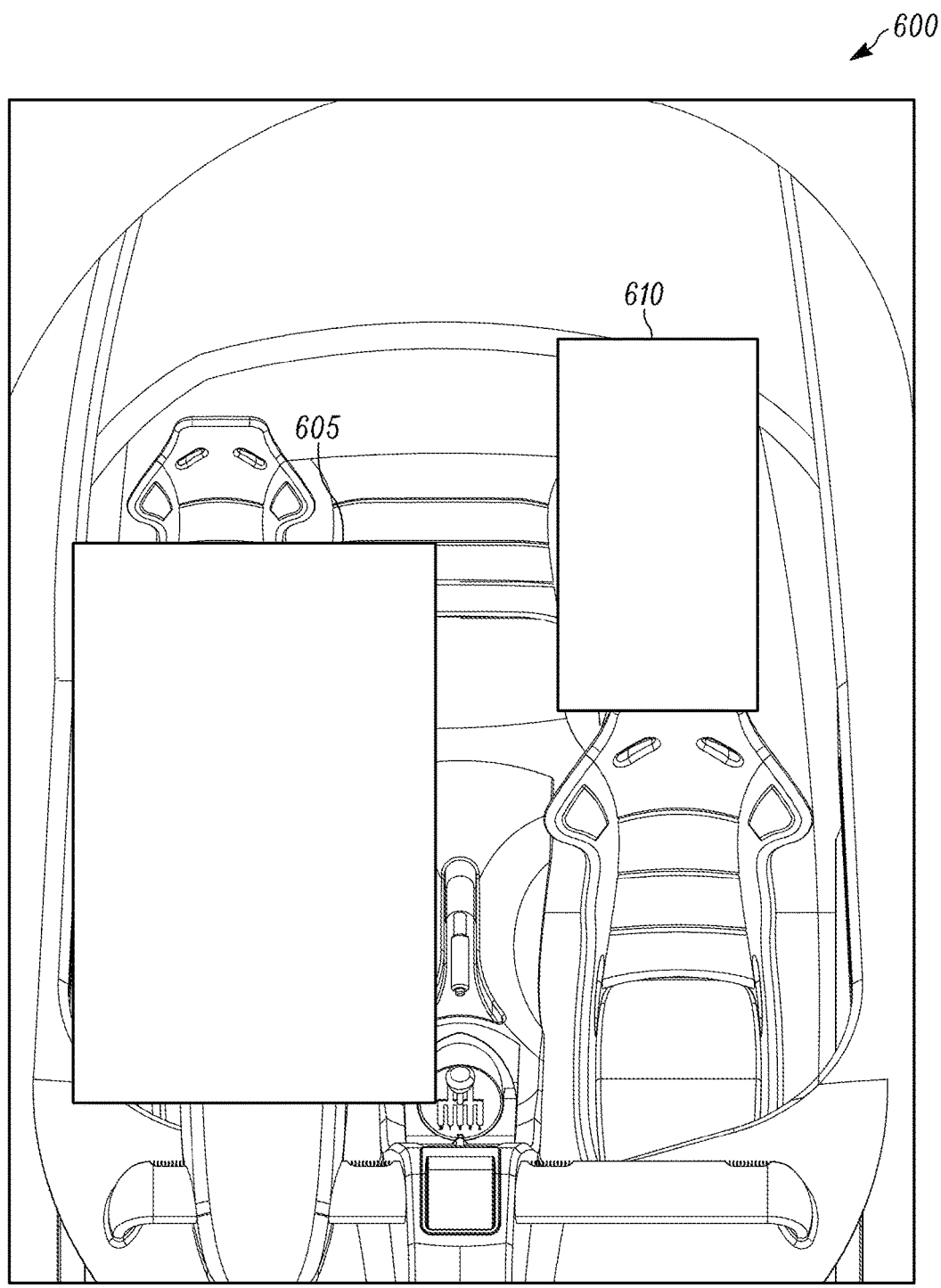
FIGS. 6-8 are privacy images of the vehicle interior with privacy protection.

If the ECU 120 determines that the privacy settings are activated (at decision block 412), then the ECU 120 generates one or more privacy images from the one or more images and controls the first transceiver 302 to transmit the one or more privacy images over the wireless network via the first antenna 304 to the remote device (for example, the remote device 144) (at block 414). In this manner, the ECU 120 generates one or more privacy images with privacy protection because the ECU 120 has determined that the privacy key and the one or more occupants are within the vehicle interior, and the ECU 120 has determined that the privacy settings are activated. In some embodiments, the privacy key may activate or adjust the privacy settings stored in the memory of the ECU 120. In some embodiments, the privacy settings have different thresholds that determine the type of information provided to the remote device A maximum threshold of the privacy settings may correspond to no image or information of the vehicle interior. A minimum threshold of the privacy settings may correspond to one or more uncensored images of the vehicle interior. A high threshold of the privacy settings may correspond to only information (for example, number of occupants) of the vehicle interior and no image. A medium-high threshold of the privacy settings may correspond to a privacy image that censors the portions of the privacy image that include the one or more occupants of the vehicle interior. For example, FIG. 6 is a privacy image 600 of the vehicle interior with privacy protection. In the illustrated embodiment, the privacy image 600 includes two portions of the privacy image 600, a first portion 605 and a second portion 610. As illustrated in FIG. 6, the first portion 605 and the second portion 610 completely censor portions (for example, the driver seat 130 and the right back seat 138, respectively) of the privacy image 600 where the ECU 120 determined the location of two occupants (for example, the first occupant 505 and the second occupant 510 as illustrated in FIG. 5) based on metadata from the image processing ECU 110.

Figure 7:
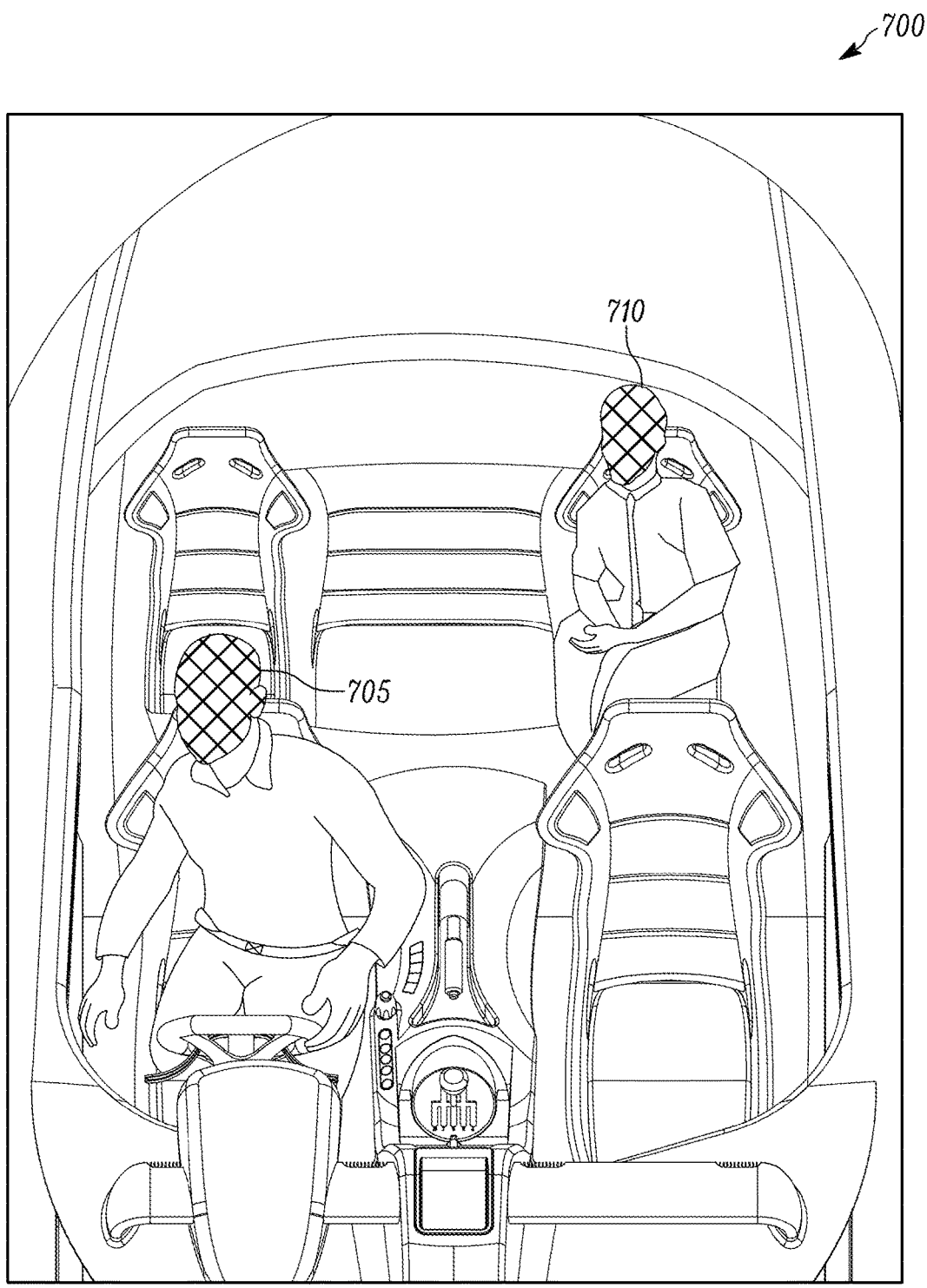
Figure 8:
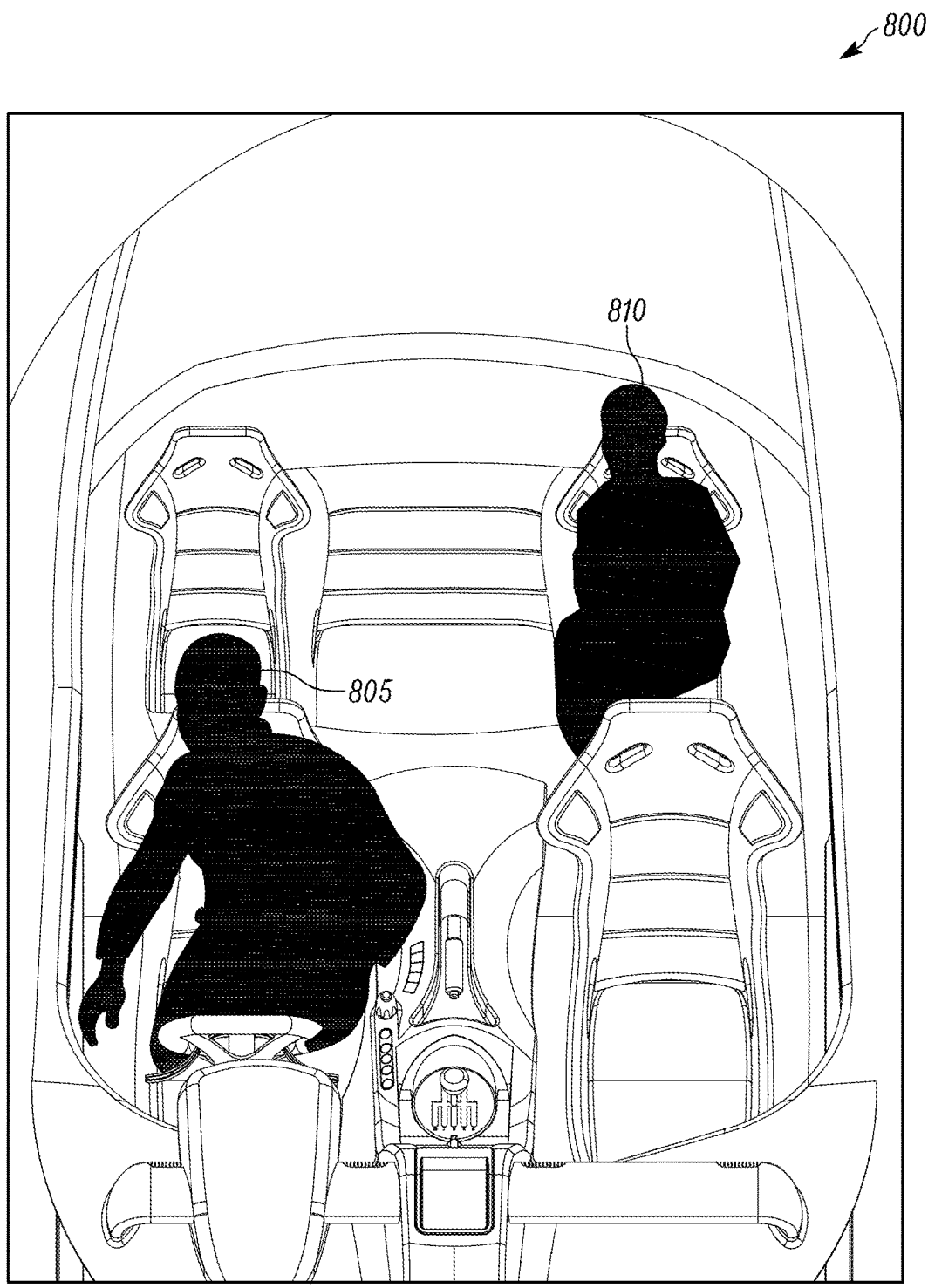

It is understood that privacy images generated by the ECU 120 are not limited to the completely censored portions as illustrated in privacy image 600, but instead the degree of censorship may be varied. For example, FIG. 7 is a privacy image 700 of the vehicle interior with privacy protection. Instead of the completely censored portions of the privacy image 600, the privacy image 700 includes blurred faces of two occupants 705 and 710. Alternatively, FIG. 8 is a privacy image 800 of the vehicle interior with privacy protection. Instead of the completely censored portions of the privacy image 600 or the blurred faces of the privacy image 700, the privacy image 800 includes censored portions 805 and 810 that correspond to the shape of two occupants (for example, occupants 705 and 710).

Optionally, in some embodiments, the ECU 120 may also determine whether a vehicle including the vehicle interior is in an accident (at decision block 416). If the ECU 120 determines that the vehicle is in an accident (at decision block 416), then the ECU 120 controls the first transceiver 302 to transmit the one or more images (for example, the image 500 as described above) from the image processing ECU 110 over the wireless network via the first antenna 304 to the remote device (at block 408). In this manner, the ECU 120 does not generate any images with privacy protection because the vehicle has been in an accident, and emergency personnel may need to gather information on the one or more occupants within the vehicle interior. In other words, an accident deactivates the privacy settings associated with the vehicle interior.

If the ECU 120 determines that the vehicle has not been in an accident (at decision block 416), and the ECU 120 determines the privacy settings are activated (at decision block 412), then the ECU 120 generates one or more privacy images from the one or more images and transmits the one or more privacy images over the wireless network via the antenna to the remote device (for example, the remote device 144) (at block 414). In this manner, the ECU 120 generates one or more privacy images with privacy protection because the ECU 120 has determined that the privacy key and the one or more occupants are located within the vehicle interior, the privacy settings are activated, and the vehicle including the vehicle interior has not been in an accident.

Thus, the invention provides, among other things, a remote view system with privacy protection and a method for operating the remote view system with privacy protection. Various features and advantages of the invention are set forth in the following claims.

What is claimed is:

1. A method of operating a remote view system with privacy protection, the method comprising:
   receiving, with an electronic control unit, a request from a remote device for one or more images of a vehicle interior of a vehicle;
   receiving, with the electronic control unit, the one or more images of the vehicle interior;
   determining, with the electronic control unit, whether a privacy key is located within the vehicle interior;
   determining, with the electronic control unit, whether one or more occupants are located within the vehicle interior;
   retrieving, with the electronic control unit, the privacy settings of the vehicle interior stored in memory;
   responsive to determining that the privacy key and the one or more occupants are located within the vehicle interior, generating, with the electronic control unit, one or more privacy images based on the one or more images of the vehicle interior and the privacy settings of the vehicle interior; and controlling a transceiver to transmit the one or more privacy images to the remote device via an antenna, wherein the privacy key is a wireless device configured to be detectable by the electronic control unit, and wherein the one or more privacy images include an image of the vehicle interior with a degree of censorship based on the privacy settings of the vehicle.

2. The method of claim 1, further comprising determining, with the electronic control unit, whether the vehicle has been in an accident and wherein generating the one or more privacy images based on the one or more images of the vehicle and the privacy settings of the vehicle interior is further in response to determining that the vehicle has not been in the accident.

3. The method of claim 2, wherein responsive to determining that the vehicle has been in the accident, the method further comprises controlling, with the electronic control unit, the transceiver to transmit the one or more images to the remote device via the antenna.

4. The method of claim 1, wherein responsive to determining that the privacy key is not located within the vehicle interior, the method further comprises controlling, with the electronic control unit, the transceiver to transmit the one or more images to the remote device via the antenna.

5. The method of claim 1, wherein responsive to determining that the one or more occupants are not located within the vehicle interior, the method further comprises controlling, with the electronic control unit, the transceiver to transmit the one or more images to the remote device via the antenna.

6. The method of claim 1, wherein when the privacy settings of the vehicle interior are deactivated, the one or more privacy images are substantially similar to the one or more images.

7. The method of claim 1, wherein when the privacy settings of the vehicle interior are set to eliminate an identity of at least one of the one or more occupants, the generated one or more privacy images eliminate the identity of the at least one of the one or more occupants in the one or more privacy images by censoring one or more portions of the one or more images that contain the one or more occupants.

8. A remote view system with privacy protection, the system comprising:
a camera configured to capture one or more images of a vehicle interior of a vehicle; and
an electronic control unit having
a first transceiver electrically coupled to a first antenna;
a second transceiver electrically coupled to a second antenna;
a memory; and
an electronic processor electrically coupled to the memory, wherein the electronic control unit is configured to
receive a request from a remote device for the one or more images of the vehicle interior via the first transceiver and the first antenna,
receive the one or more images of the vehicle interior,
determine whether a privacy key is located within the vehicle interior via the second transceiver and the second antenna,
determine whether one or more occupants are located within the vehicle interior,
retrieve privacy settings of the vehicle interior stored in the memory,
generate one or more privacy images based on the one or more images of the vehicle interior and the privacy settings of the vehicle interior in response to determining that the privacy key and the one or more occupants are located within the vehicle interior, and
control the first transceiver to transmit the one or more privacy images to the remote device via the first antenna
wherein the privacy key is a wireless device configured to be detectable by the electronic control unit, and
wherein the one or more privacy images include an image of the vehicle interior with a degree of censorship based on the privacy settings of the vehicle.

9. The system of claim 8, wherein the electronic control unit is further configured to determine whether the vehicle including the vehicle interior has been in an accident, and wherein, to generate the one or more privacy images from the one or more images and based on the privacy settings of the vehicle interior, is further in response to determining that the vehicle has not been in the accident.

10. The system of claim 9, wherein the electronic control unit is further configured to control the first transceiver to transmit the one or more images to the remote device via the first antenna in response to determining that the vehicle has been in the accident.

11. The system of claim 8, the electronic control unit is further configured to control the first transceiver to transmit the one or more images to the remote device via the first antenna in response to determining that the privacy key is not located within the vehicle interior.

12. The system of claim 8, wherein the electronic control unit is further configured to control the first transceiver to transmit the one or more images to the remote device via the first antenna in response to determining that the one or more occupants are not located within the vehicle interior.

13. The system of claim 8, wherein when the privacy settings of the vehicle interior are deactivated, the one or more privacy images are substantially similar to the one or more images.

14. The system of claim 8, wherein when the privacy settings of the vehicle interior are set to eliminate an identity of at least one of the one or more occupants, the generated one or more privacy images eliminate the identity of the at least one of the one or more occupants in the one or more privacy images by censoring one or more portions of the one or more images that contain the one or more occupants.

* * * * *